United States Patent [19]
Login et al.

[11] Patent Number: 5,961,669
[45] Date of Patent: Oct. 5, 1999

[54] ACID DONOR PROCESS FOR DYEING POLYAMIDE FIBERS AND TEXTILES

[75] Inventors: Robert B. Login, Simpsonville; Calvin McIntosh Wicker, Jr., Spartanburg, both of S.C.; Otto Bella, Tryon, N.C.

[73] Assignee: Sybron Chemicals, Inc., Birmingham, N.J.

[21] Appl. No.: 09/041,537

[22] Filed: Mar. 12, 1998

[51] Int. Cl.$^6$ .................................................. C09B 67/00
[52] U.S. Cl. .......................... 8/582; 8/405; 8/436; 8/404; 8/552; 8/580; 8/594; 8/662; 8/673; 8/674; 8/676; 8/680; 8/685
[58] Field of Search ................................ 8/582, 405, 436, 8/404, 552, 580, 594, 662, 673, 674, 676, 680, 685

[56] References Cited

U.S. PATENT DOCUMENTS

| | | |
|---|---|---|
| 3,975,515 | 8/1976 | Wajaroff et al. . |
| 3,980,428 | 9/1976 | Fabbri et al. . |
| 4,055,393 | 10/1977 | Schafer et al. ............................. 8/582 |
| 4,168,142 | 9/1979 | Hervot et al. . |
| 4,252,531 | 2/1981 | Daeuble et al. . |
| 4,381,186 | 4/1983 | Magni et al. . |
| 4,568,351 | 2/1986 | Palleiro Cardona et al. . |
| 4,668,241 | 5/1987 | Magni et al. . |
| 4,723,960 | 2/1988 | Shirasawa et al. . |
| 4,778,919 | 10/1988 | Topfl ........................................ 8/582 |
| 4,813,971 | 3/1989 | Heimann et al. . |
| 4,863,483 | 9/1989 | Donenfeld et al. . |
| 5,019,133 | 5/1991 | Himeno et al. . |

OTHER PUBLICATIONS

Clariant Corporation, Sandacid V Liquid, pp. 1–3, 1996 (Month Unknown).
Clariant Coporation, Sandacid VS Conc. Liquid, pp. 1–3, 1996 (Month Unknown).
Sandoz Colors & Chemicals, Technical Bulletin directed to Sandacid V Liquid, pp. 1–8, 1974 (Month Unknown).
T.L. Dawson and B.P. Roberts, The Essential Role of pH Control in the Dyeing of Carpet Fibres, 8 pages, 1978 (Month Unknown).
B.C. Burdett, C.C. Cook and J. Guthrie, The Effect of Buffer Systems on the Uptake of Acid Dyes by Wool and Nylon, 6 pages, 1976 (Month Unknown).

*Primary Examiner*—Alan Diamond
*Attorney, Agent, or Firm*—Dority & Manning, P.A.

[57] ABSTRACT

A process for dying materials containing natural or synthetic polyamides is disclosed. The process includes immersing the materials to be dyed in a dye bath containing an acid dye. The pH of the dye bath is initially at a level that substantially inhibits the dye from being absorbed by the polymer. In accordance with the present invention, however, an acid producing composition is added to the bath which gradually reduces the pH of the bath and allows for uniform diffusion of the dye into the polymer. The acid producing composition of the present invention is a maleate ester, which, in one embodiment, is the reaction product of maleic acid or maleic anhydride and a glycol.

29 Claims, 2 Drawing Sheets

5,961,669

ACID DONOR PROCESS FOR DYEING POLYAMIDE FIBERS AND TEXTILES

FIELD OF THE INVENTION

The present invention is generally directed to a process for dyeing various substrates and materials. More particularly, the present invention is directed to a process for dyeing natural and synthetic polyamides in a dye bath containing an acid dye, wherein the pH of the dye bath is gradually lowered and controlled by an acid producing agent which facilitates uniform dye application.

BACKGROUND OF THE INVENTION

Polyamides refer to various natural (polypeptides) and synthetic materials containing free amino groups. Examples of polyamides include nylons, wool, and silk. These materials have many different and diverse uses, especially in the field of textiles. For instance, natural and synthetic polyamide fibers are commonly used to produce fabrics and carpets.

During production of such products, the polyamide materials are typically dyed a desired color. Polyamide materials have been conventionally dyed using acid dyes, which are anionic in character. Since acid dyes are negatively charged, the dyes are attracted to positive dye sites appearing in the targeted substrate. With respect to polyamides, positive dye sites can be created by exposing the free amino groups contained within the polymer matrix to an acid. In particular, when exposed to acidic conditions, the amino groups are activated by protonation and become positively charged and cationic. Once positively charged, the acid dyes are strongly attracted to the cationic sites.

In general, acid dyes have a high affinity for protonated polyamide materials meaning that the dyes have a strong tendency to quickly bind to the polymer. Unfortunately, however, once in contact with the cationic polymer surface, acid dyes have a tendency to poorly diffuse into the polyamide. In other words, acid dyes exhibit such a high rate of strike that they do not diffuse evenly into polyamides. Thus, if the dye is absorbed by the polymer too quickly, the polyamide material can absorb the dye unevenly and not exhibit a constant shade or color.

Consequently, polyamide materials are typically dyed with acid dyes under carefully controlled conditions in order to control the rate at which the dye is absorbed by the polymer. In particular, the temperature and the pH of the dye bath are usually monitored and regulated during the process. Specifically, increasing the temperature of the bath increases the diffusion rate, while controlling the pH controls the number of dye sites that are available for receiving the acid dye. For instance, at each pH of the dye bath, a distribution equilibrium exists between the polyamide material and the dye. At higher pH's, the dye is not readily accepted by the polymer. At lower pH's, on the other hand, equilibrium shifts and the dye becomes strongly attracted to the polymer.

In conventional acid donor systems for dyeing polyamides with acid dyes, the polyamide materials are placed in a dye bath initially containing an acid dye, a leveling agent, and an acid donor sufficient for dye exhaustion. Sometimes an alkaline composition is added in an amount sufficient to raise the pH of the bath to a level that inhibits initial absorption of the dye into the polymer. The dye bath is heated to promote the hydrolysis of the acid donor composition which decrease the pH gradually. Ideally, the pH of the bath is dropped at a rate which causes the dye to slowly diffuse into the polymer substrate. If the pH can be effectively controlled, the dye becomes evenly distributed throughout the bath and substrate and is absorbed by the substrate uniformly to create a polymer having a constant color and shade. Control of the dye bath pH is essential for the attainment of level and reproducible results.

In the past, various different agents have been used in order to control and gradually decrease the pH of dye baths utilized for dyeing polyamide materials. For example, an acetate buffer composed of acetic acid and either sodium or ammonium acetate has been used for pH control. Acetic acid, however, which is volatile, was found to vaporize during some dyeing processes. Substantial vaporization of the acetic acid caused the pH of the bath to drift upwards which resulted in uneven application of the dye.

Other agents that have been added to dye baths in the past for decreasing the pH of the bath during dyeing of polyamide materials include lactones as described in U.S. Pat. No. 3,980,428, an ester of a saturated $C_2$–$C_4$-carboxylic acid as disclosed in U.S. Pat. No. 4,252,531, and cyclic esters of sulfurous acid as disclosed in U.S. Pat. No. 4,813,971.

Although the above proposed compositions have shown some success in controlling the pH of dye baths, better controls are still needed. For instance, some pH regulators used in the past are not capable of lowering the pH of the dye bath to a level low enough to ensure complete exhaustion of the dyes used, which is especially important when darker shades are desired. Further, many pH control agents in the past have been expensive to produce and have not controlled the pH of the bath as well as could be desired. Consequently, a need currently exists for further improvements in compositions and processes designed to control the pH of dye baths during the application of dyes to polyamide materials, especially nylon 6 and nylon 66 fibers, textiles and carpets.

SUMMARY OF THE INVENTION

The present invention recognizes and addresses the foregoing disadvantages, and others of prior art constructions and methods.

Accordingly, it is an object of the present invention to provide a process for dyeing polyamide materials with an anionic dye, which is also referred to as an acid dye.

Another object of the present invention is to provide a process for controlling the pH of a dye bath designed for dyeing polyamide materials.

It is another object of the present invention to provide an acid producing composition which gradually lowers the pH of a dye bath used to dye polyamide materials.

Still another object of the present invention is to control the pH of a dye bath during the dyeing of polyamide materials by adding to the bath an acid producing composition containing a maleate ester.

These and other objects of the present invention are achieved by providing a process for dyeing a material containing a synthetic or natural polyamide. The process includes the steps of contacting the material with an aqueous dye bath containing an acid dye. The dye bath initially has a pH of at least 6.5, and particularly from about 6.5 to about 10. The pH of the dye bath can be increased to the above levels by adding an alkaline composition such as soda ash, caustic soda, ammonia, borax, sodium carbonate, or sodium acetate to the bath.

In order to allow the dye to strike and bind to the polyamide, an acid producing agent is added to the dye bath. The acid producing agent contains a maleate ester. In particular, the acid producing agent is added to the bath in an amount sufficient for the pH of the bath to lower and cause the acid dye to bind to the polyamide. For instance, for most applications, the acid producing agent will be added to the bath in an amount that causes the pH of the bath to gradually decrease to a final and stable range of from about 3 to about 6, and particularly from about 4 to about 5. For most applications, during dyeing of the polyamide materials, the dye bath is heated. For example, the dye bath can be heated to a temperature of from about 90° F. to about 225° F.

The maleate ester incorporated into the dye bath is, in one embodiment, the reaction product of maleic anhydride or maleic acid and a glycol. The glycol is preferably water soluble and can be, for instance, ethylene glycol or diethylene glycol. The amount of maleate ester added to the bath will depend upon various factors. For most applications, however, the maleate ester will be added in an amount from about 0.25 grams per liter to about 8 grams per liter and more particularly from about 0.5 grams per liter to about 4 grams per liter.

The process of the present invention is well suited for dyeing all natural and synthetic polyamide or polypetide materials including wool, nylon, and silk. The articles dyed according to the process of the present invention can include, for instance, fibers, yarns, woven fabrics, knitted fabrics, carpet materials, beside many other diverse substrates.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

DETAILED DESCRIPTION OF PREFERRED EMBODIMENTS

Figure 1:
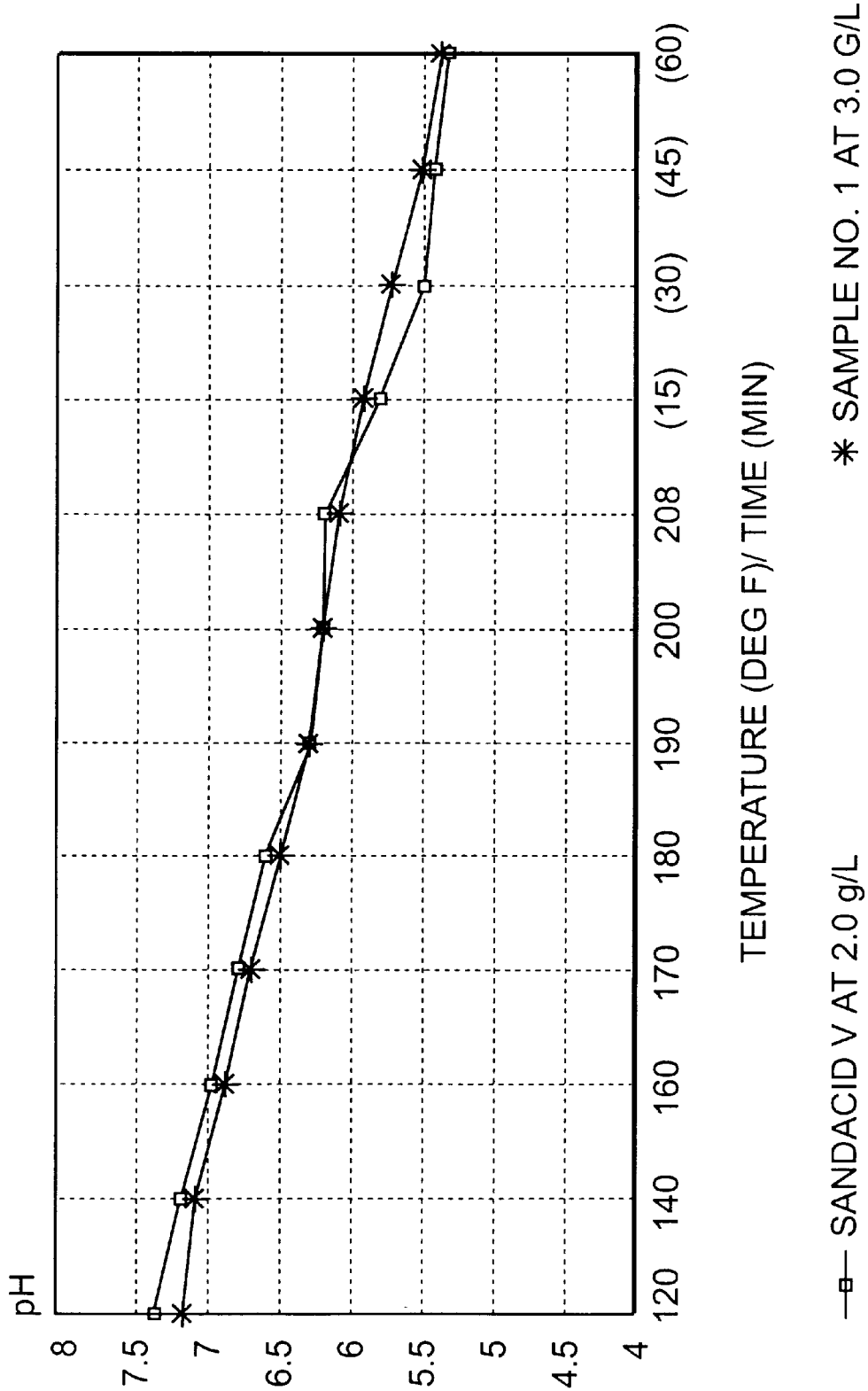
FIG. 1 is a graphical representation of the results obtained in Example No. 2.

It is to be understood by one of ordinary skill in the art that the present discussion is a description of exemplary embodiments only and is not intended to limit the broader aspects of the present invention, which broader aspects are embodied in the exemplary construction.

In general, the present invention is directed to a process for dying polyamide materials containing natural polypeptides and synthetic polyamides. Polymeric textile fibers that can be dyed in accordance with the present invention include, for instance, nylons, wool and silk. The polyamide materials are dyed in a dye bath containing acid dyes, which are anionic in character.

More particularly, in accordance with the present invention, the dye bath is initially maintained at a pH that substantially inhibits the fiber from accepting the dyes. An acid producing agent is then added to the bath which as the temperature rises slowly and gradually lowers the pH of the bath in a reproduceable fashion so that the diffusion rate of the dye into the polymer is uniform. In this manner, the polyamide materials are dyed deeply and evenly. In accordance with the present invention, the acid producing agent that is added to the bath is a maleate ester, such as a diester of maleic acid.

It has been discovered through the present invention that maleate esters provide significant benefits and advantages over acid producing agents and pH controllers now in use. For instance, in general, maleate esters have been found to provide better control over the pH of the dye bath in comparison to many conventional compositions. Because maleate diesters form vicinal diacids, the acid producing agent of the present invention is also capable of reducing the pH in the dye bath to lower levels than possible with many conventionally used agents, such as those based on saturated carboxylic acids. In particular, the pKa of the maleic acid is lower than that of saturated acids, for example 1.83 vs. 3.75 for formic acid. Further, maleate esters are inexpensive to produce, do not form precipitates in the dye bath and are not easily volatilized before or after hydrolysis.

Maleate esters incorporated into the process of the present invention can be made according to various methods. In one embodiment, the maleate esters are produced by reacting maleic acid or maleic anhydride with a polyol such as a diol, and particularly with a glycol. A glycol refers to an aliphatic alcohol containing two hydroxyl groups.

Preferably, the glycol that is reacted with the maleic acid or maleic anhydride is substantially water soluble. By using a water soluble glycol, the maleate ester formed will more uniformly distribute and disperse throughout the dye bath when added. Examples of glycols that may be used in the present invention include ethylene glycol, which provides maximum acid donor potential, and diethylene glycol. It is believed that other glycols, however, can be used including propylene glycol, polyethylene glycols, polypropylene glycols or combinations of polyethylene and polypropylene glycols either randomly dispersed or in blocks in the polymer chain.

In one aspect of the present invention, a particular glycol can be selected for constructing the maleate ester in order to achieve a desired result in accordance with a particular application. For instance, a glycol may be chosen having properties or water solubility characteristics that are tailored to a particular dying process. Further, it should be understood that different maleate esters constructed from different glycols can be combined and used together.

In general, a maleate ester constructed in accordance with the present invention can be represented as follows:

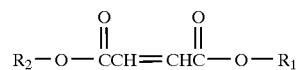

wherein $R_1$ can be the same or different from $R_2$ and wherein at least $R_1$ or $R_2$ results from a glycol. For instance, in one embodiment of the present invention, the maleate ester can contain a glycol at one end and a lower alkyl alcohol, such as $CH_3$ or $CH_2CH_3$, at the other end. The lower alkyl alcohol, however, may adversely effect the solubility of the ester product.

For most applications, however, it is preferable for both $R_1$ and $R_2$ to be glycols or polyglycols. For example, $R_1$ and $R_2$ can be as follows:

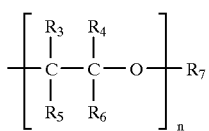

wherein $R_3$ through $R_7$ can be H, $CH_3$ or $CH_2CH_3$ and n=1 to 10.

Besides the above identified ester product, the composition of the present invention can also contain polyesters formed from the maleate esters. In particular, during synthesis of the above products, polyesters can form due to the difunctional nature of the glycols. When present, the polyesters can serve as an acid donor to the dye bath if broken down into the maleate esters that are used to form the polyester.

As stated above, the esterified maleate can include two ester groups. When added to a dye bath, the ester groups gradually hydrolyze and become cleaved, resulting in an acid. For instance, hydrolysis can be represented as follows:

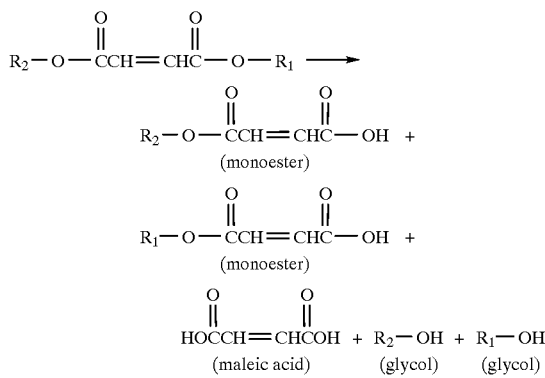

Once formed, the acid species dissociate releasing protons into the dye bath which bind to free amino groups in the polymer, causing the polyamides to more readily accept the acid dyes. Once dissociated, the acid species can be represented as follows:

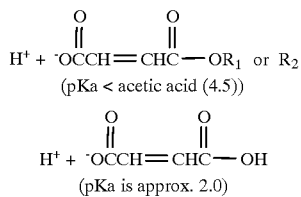

Of particular advantage, the ester groups contained in the maleate diester hydrolyze very gradually. In particular, the first ester group hydrolyzes before the second ester group. The first ester group hydrolyzes very slowly, while the second ester group hydrolyzes at a much faster rate. Due to this phenomenon, it has been discovered that the hydrolysis of maleate esters occurs gradually, which in turn translates into a gradual reduction in pH even at the higher temperatures required for dyeing. In particular, through the use of maleate diesters, the pH of a dye bath can be controlled in such a way that everywhere in the bath substantially the same pH exists at the same given time. By controlling the pH in this manner, the diffusion rate of the acid dye into the polymer is controlled and made more uniform. Specifically, the dye is absorbed into the polymer slowly so that level and complete penetration is achieved. The end result is a polyamide material having a consistent and uniform deep shade or color.

One embodiment of a process for using the acid producing agent of the present invention to dye a polyamide material will now be discussed in detail. According to the process, initially a dye bath is created containing mostly water. If desired, various surfactants and other agents can be added. Initially, the pH of the dye bath should be high enough to substantially inhibit the acid dye from striking the polymeric material. In order to increase the pH of the dye bath, an alkaline composition can be added. The alkaline composition, for instance, can contain soda ash, caustic soda, ammonia, borax, sodium carbonate, or sodium acetate. For most applications, the initial pH of the dye bath can be from about 6.5 to about 10.0. More particularly, if the polymer is to be dyed with various classes of acid dyes such as pre-mets, milling and disulfonate dyes, those skilled in the art know that the starting pH is adjusted higher for those types that have a faster strike rate.

During the process, the dye bath can be heated to higher temperatures in order to facilitate application of the dye. For instance, in most applications, the dye bath should be heated to a temperature of from about 90° F. to about 225° F. The manner, the timing, and the temperature to which the bath is heated depends primarily upon the particular application and classes of dyes.

Once the initial pH of the dye bath is adjusted, one or more acid dyes can be added to the bath. As stated above, acid dyes as used herein generally refer to anionic dyes. Such dyes that can be used include, but are not limited to, premetallized dyes, milling dyes, level dying acid dyes, and metallized dyes. Particular dyes can include, for instance, monosulphonates, and disulphonates. The particular acid dye used in the process of the present invention is generally not critical.

After the acid dye is added, the substrate to be dyed can be immersed within the bath. In general, the process of the present invention is directed to dying any materials containing polyamide polymers. Such materials can include, for instance, fibers, yarns, woven or knitted goods, and carpets.

After the substrate to be dyed has been placed in the bath, the acid producing composition of the present invention containing a maleate ester can be added. The maleate ester hydrolyzes and gradually reduces the pH of the bath causing the acid dye to gradually and uniformly diffuse into the polyamide material.

The amount of the acid producing composition added to the dye bath depends upon a number of factors. For instance, the amount added depends upon the material to be dyed, the acid dye used, the particular maleate ester used, the shade desired, the final pH desired, and the initial pH of the bath. In general, the maleate ester can be added in an amount from about 0.25 grams per liter to about 8 grams per liter, and particularly from about 0.5 grams per liter to about 4 grams per liter.

Once the acid producing composition is added to the bath, the polymer substrate is dyed until a particular shade or result is achieved. In general, the dying time will range from about 20 minutes to about 60 minutes. During dying, in most applications the pH of the bath will gradually lower to a particular level and stabilize. Once the pH stabilizes, dying is then continued until a particular result is obtained.

Once dyed, the substrate is removed from the dye bath, and finished as required.

It should be understood, however, that the above described process merely refers to one embodiment for dying a polyamide material in accordance with the present invention. Process parameters and the sequencing of the process steps may be varied. For instance, the substrate to be dyed can be added to the bath before or after the acid dye is added. Further, if desired, other chemical agents can be added to the bath, such as leveling agents.

The present invention may be better understood with reference to the following examples.

EXAMPLE NO. 1

The following example was performed in order to demonstrate one embodiment of a process for producing maleate esters that may be used in the process of the present invention. In this example, two different maleate esters were formed. In Sample No. 1 maleic anhydride was esterified with diethylene glycol, while in Sample No. 2 the maleic anhydride was esterified with ethylene glycol.

Percentages of the reactants for the two esterified products produced were as follows:

| Reactant | Percent by weight in the reaction mixture | |
|---|---|---|
| | Sample No. 1 | Sample No. 2 |
| maleic anhydride | 23.6% | 34.5% |
| ethylene glycol | — | 65.5% |
| diethylene glycol | 76.4% | — |
| water loss | (−) 4.3% | (−) 6.3% |

During the production of the above maleate esters, the diol was added in excess by about 30 mole percent. In particular, for each mole of maleic anhydride, approximately 3 moles of diol were added. The diol was added in excess for three reasons. First, the excess diol, beyond the 2 moles required by the stoichiometry of reacting with the two carboxyl groups that are generated by the opening of the anhydride, will serve as a solvent for the ester and will insure a low-viscosity, low-melting, easily handleable product. Second, the excess diol insures that the esterification goes to completion. Third, the excess diol insures that polyester formation is minimized and that diester formation is maximized.

In producing the above maleate esters, the glycol was first heated to a temperature sufficient to melt the maleic anhydride and initiate the opening of the anhydride ring. More particularly, the glycol was heated to a temperature from about 500° C. to about 70° C. In order to minimize oxidation during the reaction, a nitrogen purge was circulated through the glycol.

Maleic anhydride was added to the glycol and the reaction mixture was mixed until all of the maleic anhydride was dissolved and an extherm had ended, which indicates that the anhydride ring had opened. The temperature of the mixture was then increased to about 5° C. to about 10° C. below the boiling point of the glycol. During this step in the process, the temperature of the mixture can be modified to control the reaction rate. If the temperature is increased above the boiling point of the glycol, however, the reaction should be conducted in a closed vessel under pressure.

During heating, maleic anhydride reacts with the glycol to form a maleate ester. During this step in the process, the extent of reaction can be monitored according to two different methods: acid value or infrared determination. If the acid value of the mixture is monitored in order to determine the extent of reaction, the reaction should be allowed to continue until the final acid value is less than 1.0 mg KOH/g sample, and preferably less than 0.3 mg KOH/g sample.

If, alternatively, infrared spectral changes are monitored, the reaction should be allowed to continue until a peak at 1849 cm-1 disappears and the shift of a peak at 1780–1790 cm-1 to form a pair of peaks including a strong peak at 1724–1729 cm-1 and a weak peak at 1643–1646 cm-1.

If desired, the reaction may be catalyzed in a variety of ways. For instance, KOH or NaOH may be added at levels of 1% by weight or lower. Other esterification catalysts are also commercially available and can be used in the process.

EXAMPLE NO. 2

The following tests were performed in order to demonstrate the acid donor potential of Sample No. 1 and Sample No. 2 constructed in Example No. 1 in comparison to commercially available acid donors. Specifically, the maleate esters of the present invention were compared to SANDACID V and SANDACID VS marketed by the Clariant Corporation. SANDACID V contains butryolactone while SANDACID VS contains ethylene glycol formate.

During this example, each of the acid donor compositions were placed in a water bath. The pH of the bath was then monitored in order to illustrate the rates at which the acid producing compositions generate acid. The results are illustrated in FIGS. 1 and 2.

Referring to FIG. 1, the performance of SANDACID V is compared to Sample No. 1 of the present invention, which is maleic anhydride esterified with diethylene glycol. Sample No. 1 was added to a water bath at a concentration greater than the SANDACID V, but at the same molar equivalent.

As shown in FIG. 1, the maleate ester of the present invention was very comparable in performance to SANDACID V. The maleate ester, however, is cheaper to produce and is less volatile than SANDACID V.

Figure 2:
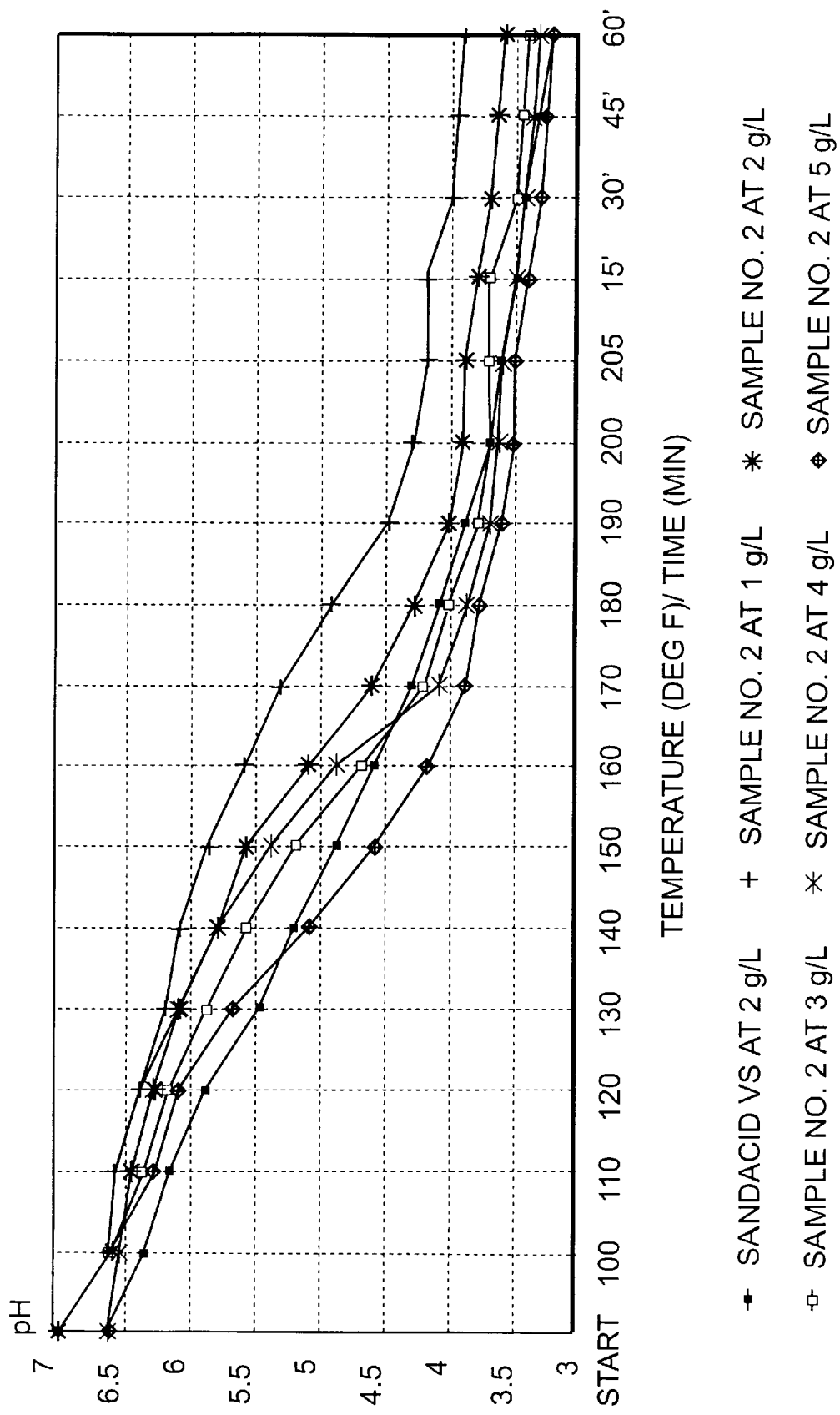
FIG. 2 is a graphical representation of the results achieved in Example No. 2.

Referring to FIG. 2, a comparison of SANDACID VS to the maleate ester formed from ethylene glycol (Sample No. 2) at different concentrations is illustrated. As shown, the maleate ester compared favorably with SANDACID VS. Further, FIG. 2 also illustrates that by varying the concentration of the maleate ester, different pH profiles will occur.

EXAMPLE NO. 3

In this Example, samples of nylon fabric were placed in a dye bath and dyed using an acid dye. During the dying process, the maleate esters constructed in Example 1 were added to the bath in order to control and gradually lower the pH. For comparative purposes, a test was also conducted using SANDACID V under similar conditions.

In particular, a 100% nylon, type 6 fabric was dyed during the test. The acid dye used was 1.5% (owf) TECTILON RED 2B 200% (CI Acid Red 361). During the dying process a leveling agent was also added. The leveling agent was 1.0% (owf) MIGRASSIST WWB, which is available from Sybron Chemicals, Inc.

The dying procedure included first heating the bath containing the fabric, water and the acid dye to a temperature of about 80° F. The leveling agent and acid donor composition were then added. The temperature of the bath was raised at a rate of 2° F. per minute to a final temperature of from about 205° F. to about 207° F. The pH of the bath was monitored. Once a final temperature was reached, the dying continued for 1 hour. After dying, the fabric samples were cool drained, rinsed and dried.

Three different tests were conducted. In one test, SANDACID V was used as the acid donor. In the remaining two tests, a maleate ester constructed from diethylene glycol (Sample No. 1) and a maleate ester constructed from ethylene glycol (Sample No. 2) were used. The results are as follows:

| Temp = °F. | 2.0% SANDACID V liq. pH | 3.0% Sample No. 1 pH | 1.0% Sample No. 2 pH |
| --- | --- | --- | --- |
| Start: 80° F. | 8.8 | 6.5 | 8.7 |
| 100° F. | 7.3 | 6.5 | 6.9 |
| 120° F. | 7.2 | 6.5 | 6.7 |
| 140° F. | 7.1 | 6.5 | 6.5 |
| 160° F. | 6.9 | 6.4 | 6.3 |
| 170° F. | 6.8 | 6.3 | 6.2 |
| 180° F. | 6.6 | 6.2 | 6.2 |
| 190° F. | 6.4 | 6.1 | 6.1 |
| 200° F. | 6.2 | 6.0 | 6.1 |
| 205° F. | 6.1 | 5.9 | 6.0 |
| 205° F. - 20 min. | 5.8 | 5.7 | 5.9 |
| 205° F. - 40 min. | 5.6 | 5.4 | 5.7 |
| 205° F. - 60 min. | 5.5 | 5.3 | 5.4 |

As shown above, the pH of the dye baths containing the maleate esters of the present invention generally decreased more smoothly and more gradually after initial heating. As a result, more level dying of the nylon fabric occurred in the dye baths containing the maleate esters as opposed to the dye bath containing SANDACID V. Consequently, the color of the nylon samples that were dyed in the dye bath containing the maleate esters compared favorably with the nylon fabric dyed in the dye bath containing SANDACID V.

EXAMPLE NO. 4

In this example, 100% texturized nylon knit (Banlon) fabric samples were dyed in a dye bath containing a maleate ester constructed from ethylene glycol (Sample No. 2 from Example NO. 1). For comparative purposes, in a second dye bath, the same fabric was dyed using SANDACID VS as the acid donor. In this example, it was observed that the maleate ester of the present invention outperformed SANDACID VS.

In each test, the nylon fabrics were placed in a dye bath at 90° F. containing the following ingredients:

0.5% (owf) TANNEX GEO, which is a bleaching auxiliary available from Sybron Chemicals, Inc.

1.0% (owf) TANAPAL NC, which is a dying auxiliary also available from Sybron Chemicals, Inc.

0.11% (owf) SODA ASH (only added to bath containing SANDACID VS)

0.1% (owf) Sandolan Milling Yellow N-7GL acid dye

After 5 minutes, the acid donor compositions were added. After 10 minutes, the temperature of the dye baths were raised to about 180° F. at a rate of 1.5° F per minute. Once heated, the fabric samples remained in the bath for 20 minutes. After dying, the samples were cooled, placed in a drop bath, rinsed, and dried.

The pH of each bath during the dying process was monitored. The following results were obtained:

| Temp. deg F/Time (min) | SANDACID VS Liquid pH | Sample No. 2 pH |
| --- | --- | --- |
| 90 Deg F/Start | 8.4 | 8.5 |
| 90 /10 min | 6.8 | 7.1 |
| 100 | 6.7 | 7.0 |
| 110 | 6.5 | 6.9 |
| 120 | 6.2 | 6.7 |
| 130 | 5.7 | 6.6 |
| 140 | 5.5 | 6.5 |
| 150 | 5.4 | 6.4 |
| 160 | 5.3 | 6.3 |
| 170 | 5.o | 6.1 |
| 180 | 4.7 | 5.8 |
| 180 /10 min. | 4.5 | 5.6 |
| 180 /20 min. | 4.5 | 5.5 |
| Fabric appearance | front and back differ | uniform |

As shown above, the pH drift of the dye bath containing the maleate ester of the present invention was more gradual and controlled than the pH drift of the bath containing SANDACID VS.

Fabric samples collected during the dying process were visually compared. It was observed that the color of the fabric dyed using SANDACID VS was irregular in appearance. In particular, the back of the fabric always appeared to much lighter in color than the front of the fabric. In contrast, the fabric dyed using the maleate ester of the present invention was very uniform in color, displaying the same color on the front and the back of the fabric. Further, the fabric dyed in the dye bath containing the maleate ester of the present invention changed color much more gradually than the fabric contained in the dye bath containing SANDACID VS.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process for dyeing a material containing a synthetic or natural polyamide, said process comprising the steps of:

contacting said material with an aqueous dye bath containing an acid dye, said dye bath having an initial pH that inhibits said acid dye from bonding to said polyamide contained in said material;

adding to said dye bath an acid producing agent, said acid producing agent comprising a maleate diester, said acid producing agent being added to said dye bath in an amount sufficient to lower the pH of said bath thereby causing said acid dye to bind to said polyamide contained within said material.

2. A process as defined in claim 1, wherein said maleate diester comprises a reaction product of maleic anhydride or maleic acid and a glycol.

3. A process as defined in claim 2, wherein said glycol comprises a material selected from the group consisting of ethylene glycol and diethylene glycol.

4. A process as defined in claim 2, wherein said glycol is water soluble.

5. A process as defined in claim 1, wherein said acid producing agent is added to said dye bath in an amount sufficient to reduce the final pH of said bath to a range of from about 3 to about 6.

6. A process as defined in claim 1, wherein said synthetic or natural polyamide comprises a material selected from the group consisting of nylon, wool, and silk.

7. A process as defined in claim 1, further comprising the step of heating said dye bath to a temperature of from about 90° F. to about 225° F. during application of said acid dye to said material.

8. A process as defined in claim 1, wherein said maleate diester is added to said dye bath in an amount from about 0.25 gram per liter to about 8 grams per liter.

9. A process as defined in claim 1, wherein said maleate diester is added to said dye bath in an amount from about 0.5 grams per liter to about 4 grams per liter.

10. A process for dyeing a textile material containing a synthetic or natural polyamide, said process comprising the steps of:
    contacting said textile material with an aqueous dye bath containing an acid dye;
    adding to said dye bath an acid producing agent, said acid producing agent comprising an esterified maleate having the following formula:

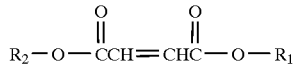

wherein $R_1$ results from a glycol and $R_2$ results from a glycol or a lower alkyl alcohol, said acid producing agent being added to said dye bath in an amount sufficient to lower the pH of said bath for causing said acid dye to bind to said polyamide contained within said textile material.

11. A process as defined in claim 10, wherein $R_1$ and $R_2$ both result from glycols.

12. A process as defined in claim 10, wherein $R_1$ has the following formula:

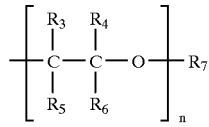

wherein $R_3$, $R_4$, $R_5$, and $R_6$ are H, $CH_3$ or $CH_2CH_3$; $R_7$ is H; and n=1 to 10.

13. A process as defined in claim 10, wherein $R_1$ and $R_2$ result from ethylene glycol.

14. A process as defined in claim 10, wherein $R_1$ and $R_2$ result from diethylene glycol.

15. A process as defined in claim 10, wherein said polyamide comprises nylon.

16. A process as defined in claim 10, wherein said acid producing agent is added to said dye bath in an amount sufficient to lower the pH of said bath to a final range of from about 4 to about 5.

17. A process for dyeing a material containing a synthetic or natural polyamide, said process comprising the steps of:
    contacting said material with an aqueous dye bath containing an acid dye;
    adding to said dye bath an acid producing agent, said acid producing agent comprising a diesterified maleate, said maleate being diesterified by a substantially water soluble glycol, said acid producing agent being added to said dye bath in an amount sufficient to gradually lower the pH of said bath to a point where said acid dye bonds to said polyamide contained within said material.

18. A process as defined in claim 17, wherein said substantially water soluble glycol comprises ethylene glycol.

19. A process as defined in claim 17, wherein said substantially water soluble glycol comprises diethylene glycol.

20. A process as defined in claim 17, wherein said acid producing agent is added to said dye bath in an amount sufficient to lower the pH of said bath to a final range of from about 4 to about 5.

21. A process as defined in claim 17, wherein said acid producing agent is added to said dye bath in an amount from about 0.25 grams per liter to about 8 grams per liter.

22. A process as defined in claim 17, wherein said acid producing agent is added to said dye bath in an amount from about 0.5 grams per liter to about 4 grams per liter.

23. A process as defined in claim 17, wherein said material being dyed is a material selected from the group consisting of carpets, fibers, yarns, woven goods, and knitted goods.

24. A process as defined in claim 17, wherein said polyamide comprises a material selected from the group consisting of nylons, wool, and silk.

25. A dye bath for dying polyamide materials comprising an aqueous solution containing an acid dye and a maleate diester, said maleate diester consisting essentially of a reaction product of maleic acid or maleic anhydride and a glycol.

26. A dye bath as defined in claim 25, further comprising a leveling agent.

27. A dye bath as defined in claim 25, wherein said maleate diester has the following formula:

wherein $R_1$ and $R_2$ result from a glycol selected from the group consisting of ethylene glycol, diethylene glycol and mixtures thereof.

28. A dye bath as defined in claim 27, wherein $R_1$ and $R_2$ result from ethylene glycol.

29. A dye bath as defined in claim 27, wherein $R_1$ and $R_2$ result from diethylene glycol.

* * * * *